(12) United States Patent
Steiss et al.

(10) Patent No.: US 7,360,064 B1
(45) Date of Patent: Apr. 15, 2008

(54) THREAD INTERLEAVING IN A MULTITHREADED EMBEDDED PROCESSOR

(75) Inventors: Donald Steiss, Richardson, TX (US); Earl T Cohen, Fremont, CA (US); John J Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 464 days.

(21) Appl. No.: 10/733,153

(22) Filed: Dec. 10, 2003

(51) Int. Cl.
*G06F 9/38* (2006.01)

(52) U.S. Cl. ........................... 712/219; 712/214

(58) Field of Classification Search ............ 712/214, 712/219
See application file for complete search history.

(56) References Cited

U.S. PATENT DOCUMENTS

| | | | |
|---|---|---|---|
| 5,613,114 | A | 3/1997 | Anderson et al. |
| 5,724,586 | A | 3/1998 | Edler et al. |
| 5,742,822 | A | 4/1998 | Motomura |
| 5,771,382 | A | 6/1998 | Wang et al. |
| 5,799,188 | A | 8/1998 | Manikundalam et al. |
| 5,881,277 | A | 3/1999 | Bondi et al. |
| 5,907,702 | A | 5/1999 | Flynn et al. |
| 5,913,049 | A | 6/1999 | Schiell et al. |
| 5,991,792 | A | 11/1999 | Nageswaran |
| 6,016,542 | A | 1/2000 | Gottlieb et al. |
| 6,073,159 | A | 6/2000 | Emer et al. |
| 6,076,157 | A | 6/2000 | Borkenhagen et al. |
| 6,105,051 | A | 8/2000 | Borkenhagen et al. |
| 6,212,544 | B1 | 4/2001 | Borkenhagen et al. |
| 6,216,220 | B1 | 4/2001 | Hwang |
| 6,223,208 | B1 | 4/2001 | Kiefer et al. |
| 6,256,775 | B1 | 7/2001 | Flynn |
| 6,272,520 | B1 | 8/2001 | Sharangpani et al. |
| 6,292,888 | B1 | 9/2001 | Nemirovsky et al. |
| 6,308,261 | B1 | 10/2001 | Morris et al. |
| 6,341,347 | B1 | 1/2002 | Joy et al. |
| 6,353,881 | B1 | 3/2002 | Chaudhry et al. |
| 6,385,715 | B1 | 5/2002 | Merchant et al. |
| 6,411,982 | B2 | 6/2002 | Williams |

(Continued)

OTHER PUBLICATIONS

Regnier et al., ETA: Experience with an Intel/spl reg/Xeon/spl trade/processor as a Packet Processing Engine, Proceedings of the 11th Symposium on High Performance Interconnects, IEEE, Aug. 20-22, 2003, pp. 76-82.*

(Continued)

*Primary Examiner*—William M. Treat
(74) *Attorney, Agent, or Firm*—Needle & Rosenberg P.C.

(57) ABSTRACT

The present invention provides a network multithreaded processor, such as a network processor, including a thread interleaver that implements fine-grained thread decisions to avoid underutilization of instruction execution resources in spite of large communication latencies. In an upper pipeline, an instruction unit determines an instruction fetch sequence responsive to an instruction queue depth on a per thread basis. In a lower pipeline, a thread interleaver determines a thread interleave sequence responsive to thread conditions including thread latency conditions. The thread interleaver selects threads using a two-level round robin arbitration. Thread latency signals are active responsive to thread latencies such as thread stalls, cache misses, and interlocks. During the subsequent one or more clock cycles, the thread is ineligible for arbitration. In one embodiment, other thread conditions affect selection decisions such as local priority, global stalls, and late stalls.

18 Claims, 9 Drawing Sheets

U.S. PATENT DOCUMENTS

| | | | |
|---|---|---|---|
| 6,418,458 | B1 | 7/2002 | Maresco |
| 6,477,562 | B2 | 11/2002 | Nemirovsky et al. |
| 6,490,612 | B1 | 12/2002 | Jones et al. |
| 6,507,862 | B1 | 1/2003 | Joy et al. |
| 6,535,905 | B1 | 3/2003 | Kalafatis et al. |
| 6,542,920 | B1 | 4/2003 | Belkin et al. |
| 6,542,921 | B1 | 4/2003 | Sager |
| 6,542,987 | B1 | 4/2003 | Fischer et al. |
| 6,556,045 | B2 | 4/2003 | Cohen |
| 6,567,839 | B1 | 5/2003 | Borkenhagen et al. |
| 6,584,488 | B1 | 6/2003 | Brenner et al. |
| 6,594,755 | B1 | 7/2003 | Nuechterlein et al. |
| 6,785,890 | B2 | 8/2004 | Kalafatis et al. |
| 6,792,446 | B2 | 9/2004 | Merchant et al. |
| 6,889,319 | B1 | 5/2005 | Rodgers et al. |
| 6,931,639 | B1 | 8/2005 | Eickemeyer |
| 7,013,400 | B2 | 3/2006 | Kalla et al. |
| 7,051,329 | B1 | 5/2006 | Boggs et al. |
| 2001/0032307 | A1* | 10/2001 | Rohlman et al. ........... 712/219 |
| 2001/0056456 | A1 | 12/2001 | Cota-Robles |
| 2002/0010733 | A1 | 1/2002 | Baba et al. |
| 2002/0062435 | A1* | 5/2002 | Nemirovsky et al. ........... 712/7 |
| 2002/0087840 | A1 | 7/2002 | Kottapalli et al. |
| 2003/0037228 | A1 | 2/2003 | Kelsey et al. |
| 2003/0154235 | A1 | 8/2003 | Sager |
| 2003/0158885 | A1 | 8/2003 | Sager |
| 2003/0163589 | A1 | 8/2003 | Bunce et al. |
| 2003/0163678 | A1 | 8/2003 | Bennett et al. |

OTHER PUBLICATIONS

Boothe, B. and Ranade, A. G., "Improved Multithreading Techniques for Hiding Communication Latency in Multiprocessors," ACM 1992, pp. 214-223.

Gulati, M. and Bagherzadeh, N., "Performance Study of a Multithreaded Superscalar Microprocessor," 2nd International Symposium on High-Performance Computer Architecture, Feb. 1996, 11 pages.

Loikkanen, M. and Bagherzadeh, N., "A Fine-Grain Multithreading Superscalar Architecture," Proc. 1996 Confer. Parallel Architectures and Compilation Techniques, Oct. 1996, 6 pages.

Tullsen, D. M. et al., "Exploiting Choice: Instruction Fetch and Issue on an Implementable Simultaneous Multithreading Processor," Proc. Of the 23rd ISCA, May 1996, 12 pages.

Tullsen, D. M. et al., "Simultaneous Multithreading: Maximizing On-Chip Parallelism," Proc. Of the 22nd ISCA, Jun. 1995, 12 pages.

Yamamoto, W., "An Analysis of Multistreamed, Superscalar Processor Architectures," Ph.D. Thesis, U.C. Santa Barbara, Dec. 1995, pp. 1-155.

* cited by examiner

THREAD INTERLEAVING IN A MULTITHREADED EMBEDDED PROCESSOR

BACKGROUND OF THE INVENTION

1. Field of the Invention

This invention relates generally to computer processors and, more specifically, to a multithreaded processor architecture for interleaving multiple instruction threads within an execution pipeline.

2. Background Art

Until recently, a lack of network bandwidth posed restraints on network performance. But emerging high bandwidth network technologies now operate at rates that expose limitations within conventional computer processors. Even high-end network devices using state of the art general purpose processors are unable to meet the demands of networks with data rates of 2.4-Gbs, 10-Gbs, 40-Gbs and higher. Network processors are a recent attempt to address the computational needs of network processing which, although limited to specialized functionalities, are also flexible enough to keep up with often changing network protocols and architecture. However, current network processors have failed to exploit certain characteristics of network processing by relying too much on general processing architectures and techniques.

Multithreading is a technique that improves the effective CPIs (Cycles Per Instruction) of a processor. Multithreading can be done at the software level or at the hardware level. In software-level multithreading, an application program uses a process, or a software thread, to stream instructions to a processor for execution. A multithreaded software application generates multiple software processes within the same application and a multithreaded operating system manages their dispatch, along with other processes, to the processor (compare with a multitasking software that manages single processes from multiple applications). By contrast, in hardware-level multithreading, a processor executes hardware instruction threads in a manner that is independent from the software threads. While single-threaded processors operate on a single thread at a time, multithreaded processors are capable of operating on instructions from different software processes at the same time. A thread dispatcher chooses a hardware thread to commence through the processor pipeline. "Multithreading" and "threads" as used herein, refer to hardware multithreading and hardware instruction threads, respectively.

One problem with conventional multithreading is that once an instruction thread is dispatched, any subsequent thread stalls at a pipeline stage introduce bubbles or unutilized cycles in an execution unit. A thread is dispatched at an instruction fetch stage by retrieving associated instructions from memory. The dispatched thread continues through the pipeline according to this instruction fetch sequence. Thread stalls can be due to data cache misses, interlocks, register dependencies, retires, or other conditions that cause an instruction to not be available for execution. Because instruction streams in a conventional scalar processor are locked in-order after dispatch, a subsequent instruction that is ready for execution in the execution unit, must wait until the pipeline stall is cleared before resuming. Wasted cycles in the execution unit, regardless of overall clock speed, reduce effective processing clock speed with reduced throughput. In some instances, multithreading can result in reduced processor performance by increasing CPIs.

One approach to reducing the effects of pipeline latencies has been implemented in coarse-grained multithreaded systems. Coarse-grained multithreading runs instruction threads in blocks. Typically, user-interactive threads dominate the pipeline while background threads attempt to fill in utilization gaps. In other words, when a thread block experiences a high-latency event, a new thread is dispatched down the pipeline until the latency is resolved, at which point, the original thread is reinstated. However, because there is also delay associated with overhead from dispatching the new thread in addition to reinstating the original thread, coarse-grained multithreading is not effective for frequent thread switching and low-latency events. Moreover, the switching latency grows proportionately with longer pipelines.

Therefore, what is needed is a multithreaded processor capable of fine-grained thread switch decisions sequentially proximate to execution. Furthermore, there is a need for a method that decouples a thread execution sequence from an instruction fetch sequence.

SUMMARY OF THE INVENTION

The present invention meets these needs by providing a multithreaded processor such as a network processor that implements fine-grained thread switch decisions sequentially proximate to an execution unit. The thread switch decisions generate a thread execution sequence that is independent from an instruction fetch sequence. Advantageously, the invention increases processor utilization by making critical performance decisions based on pipeline conditions without needing to take dispatch latencies into account. As a result, the present invention allows packet processing devices to meet high performance demands, such as those of a 40-Gb/s network, by reducing execution stalls to increase processor utilization.

In one embodiment, the multithreaded processor comprises an upper pipeline coupled by a signal line to a lower pipeline. The upper pipeline comprises an instruction unit coupled to a decode unit that further comprises an instruction queue. In the upper pipeline, the instruction unit fetches and decodes instructions according to an instruction fetch sequence. The instruction queue stores decoded instructions until output for execution. The lower pipeline comprises a thread interleaver directly coupled to an execution pipeline that includes a register file coupled to an execution unit. In the lower pipeline, a first embodiment of the thread interleaver determines a thread execution sequence independent of the instruction fetch sequence. The execution unit can execute thread instructions for a different thread each cycle. Moreover, the sequential location of the thread interleaver relative to the execution pipeline preferably allows instructions to be executed within one or two cycles after dispatch decisions.

In a second embodiment of the thread interleaver, a signal line coupled between an output of the execution unit and an input of the thread interleaver feeds back a thread conditions signal comprising execution stall information for each thread. Execution stalls of a thread include, for example, data cache misses, interlocks, dependencies, retries, and any other condition causing execution stalls. During the subsequent one or more clock cycles following an execution stall, the thread is ineligible for arbitration. Ineligibility continues until the instruction is retried, a timing interlock expires, etc. Other thread conditions include, for example, local priority, global stalls, and late stalls.

In a third embodiment of the thread interleaver, the selection unit comprises a high priority unit and a low priority unit that are coupled to a control multiplexer ("mux") to select threads using two-level round robin arbitration. Inputs to the high and low priority units are coupled to signal lines to receive instruction conditions from the instruction queue and thread conditions from the execution unit. As a default, when all thread conditions are equal or similar, threads are selected on a round robin basis. Otherwise, the high priority unit and the low priority unit implement round robin between threads associated with high priority instructions and threads associated with low priority instructions. From these two selections, the control mux generally selects the high priority selection. But the control mux can hold the previous selection (which may be the low priority selection) responsive to a late stall signal, and selects the low priority selection if there is no high priority selection. To implement the selection, the control mux is coupled to a selection mux by a signal line to send a control signal. An output of the selection mux provides the output of the thread interleaver.

In another embodiment of the multithreaded processor, a queue depth line coupled from the instruction queue to the instruction unit feeds back a queue depth signal indicating queue depth information for each thread. The instruction unit algorithm fetches instructions based, in part, on the thread queue depth information.

DETAILED DESCRIPTIONS OF THE PREFERRED EMBODIMENTS

I. Introduction

Many variations will be apparent to one of ordinary skill in the art that would yet be encompassed by the spirit and scope of the invention. For example, one of ordinary skill will recognize that aspects of the invention described with respect to a single processor are also applicable to a multiple processors having multiple pipelines. Additionally, although the present invention provides optimum performance to a network processor, it may be implemented in any environment such as in supercomputers, personal computers, workstations, PDAs (Personal Digital Assistants), and the like. Accordingly, the below description is included to illustrate the operation of the preferred embodiments and is not meant to limit the scope of the invention. Rather, the scope of the invention is to be limited only by the claims that follow.

II. Network Processing System

Figure 1:
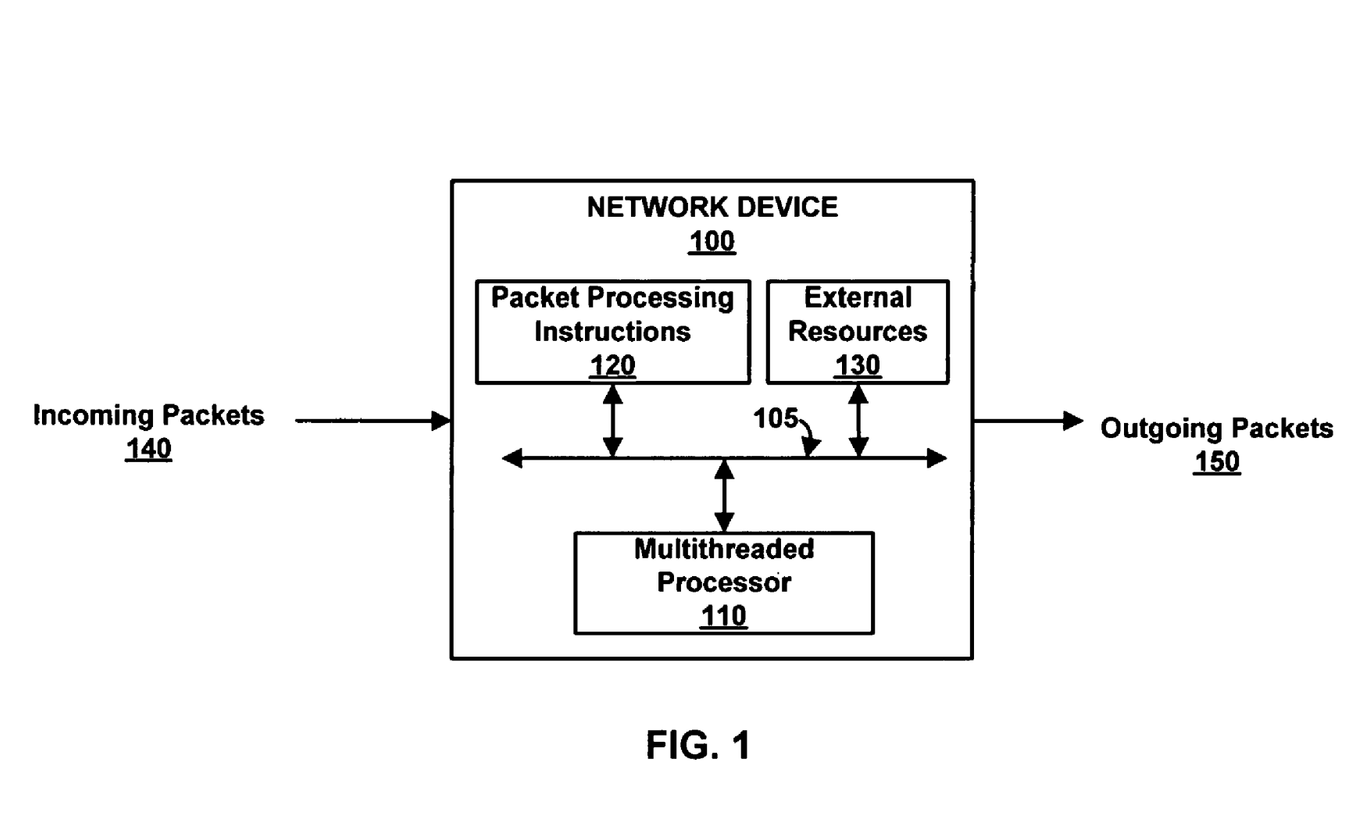
FIG. 1 is a block diagram illustrating a network processing system according to one embodiment of the present invention.

FIG. 1 is a block diagram illustrating a network processing system 100 according to one embodiment of the present invention. The system 100 comprises a multithreaded processor 110, packet processing instructions 120, and external resources 130 coupled by a bus 105. The system 100 may be a specialized computing device such as a router, a switch, a bridge, a gateway, or a combination of devices such as the 12000-series systems manufactured and sold by Cisco Systems, Inc. of Sunnyvale, Calif. The system 100 processes incoming packets 140 received from a network resulting in outgoing packets 150 sent through the network. More specifically, multithreaded processor 110 executes the packet processing instructions 120 with the help of external resources 130 to perform various tasks such as routing, switching, bridging, and packet forwarding using various network protocols such as TCP/IP (Transmission Control Protocol/Internet Protocol), ATM (Asynchronous Transfer Mode), IEEE 802.3, IEEE 802.11, etc. The system 100 operates to service high-speed networks with bandwidths of 2.4-Gbs, 10-Gbs, 40-Gbs and above.

The packet processing instructions 120 comprise a set of instructions, packet processing extensions, or software code that is executed by the multithreaded processor 110. Examples of packet processing extensions include bit field manipulation instructions, checksum acceleration instructions, and encryption instructions. In one embodiment, at least some instructions include an external priority set by a programmer or other software. The external priority influences thread interleave decisions as described below. In one embodiment, an operating system such as VxWorks by WindRiver of Alameda, Calif. or other controlling software manages instruction flow to the multithreaded processor 110.

The external resources 130 provide co-processing and/or other helper capabilities to the multithreaded processor 110. For example, a CAM (Content Addressable Memory) device provides ACL (Access Control List) look-ups, a search engine provides packet forwarding translations, and a buffer stores the incoming and outgoing network packets 140, 150. Additional memory elements such as SRAM (Static Random Access Memory) or EEPROM (Electronically Erasable Programmable Read Only Memory) store packet processing instructions 120. Use of external resources 130 by the multithreaded processor 110 can cause external resource stalls to a thread as described below.

The multithreaded processor 110 processes instructions from the packet processing application 120 with fine-grained thread interleaving sequentially proximate to execution. The multithreaded processor 110 processes multiple instruction threads, $T_m^k$, where, for example, m=2, 4, 128 or more multithreaded instructions and k=the $k^{th}$ instruction from thread m. Additionally, the multithreaded processor 110 can contain in its pipeline, more than one instruction from the same thread at the same time. The multithreaded processor 110 comprises, for example, a network processor, a general processing unit, an x86-type processor, an application specific integrated circuit, or the like. The multithreaded processor 110 is implementable as an integrated circuit on substrates such as silicon or geranium, a field programmable device, a nanotechnology-based chip, or any other device and/or software combination for implementing logic functionality at high data rates. In one embodiment, the multithreaded processor 110 is implemented as described with reference to FIGS. 2-4 performing methods as described with reference to FIGS. 5-6.

III. Multithreaded Processor

Figure 2:
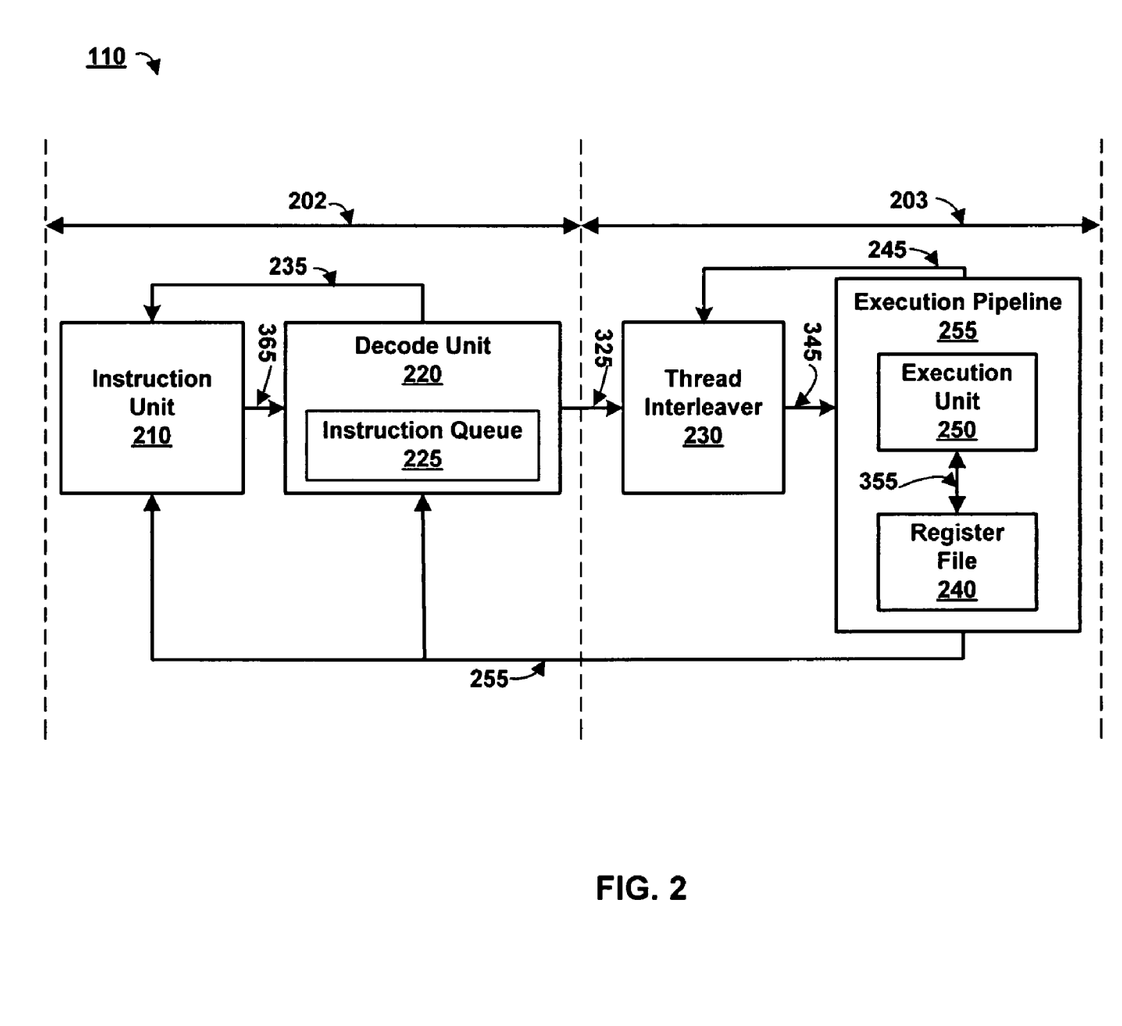
FIG. 2 is a block diagram illustrating the multithreaded processor according to one embodiment of the present invention.

FIG. 2 is a block diagram illustrating the multithreaded processor 110 according to one embodiment of the present invention. The multithreaded processor 110 comprises an upper pipeline 202 having an output that is coupled by a signal line 325 (or instruction bus) to an input of a lower pipeline 203, both the upper pipeline 202 and the lower pipeline 203 having pipeline stages. Generally, pipeline stages represent a particular functionality optimized for performance in synchronization with a system clock (not shown). A pipeline stage, or portions of the functionality therein, may be implemented by hardware and/or software. Preferably, each pipeline stage performs its function within a clock cycle. However, at the level of abstraction of FIG. 2, the pipeline stages may use more or less than a single clock cycle. Additionally, the pipeline stages are merely illustrative. One of ordinary skill in the art will recognize that the upper and lower pipelines 202, 203 together may vary from fewer than four to more than twelve pipeline stages, and still fall within the scope of the present invention.

The upper pipeline 202 comprises an instruction unit 210 coupled by a signal line 365 to a decode unit 220 that further comprises an instruction queue 225. The input of the instruction unit 210 forms the input of the upper pipeline 202. The output of the instruction queue 225 forms the output of the decode unit 210 and the upper pipeline 202. In the upper pipeline 202, the instruction unit 210 determines an instruction fetch sequence according to an instruction fetch algorithm. The instruction fetch algorithm organizes instructions fetches from instruction caches and off chip memory for dispatch. Typically, several instructions for a single thread are fetched together, which may not be optimal for execution.

The lower pipeline 203 comprises a thread interleaver 230 coupled by a signal line 345 to an execution pipeline 255. The execution pipeline 255 further comprises an execution unit 250 coupled by a signal line 355 to a register file 240. An input of the thread interleaver 230 forms the input of the lower pipeline 203. In the lower pipeline 203, a first embodiment of the thread interleaver 230 determines a thread execution sequence independent of the instruction fetch sequence. The instruction fetch sequence is thus capable of being resequenced relative to the thread execution sequence as shown and discussed below with reference to FIG. 6C. The thread execution sequence (or thread interleave sequence) organizes instructions sent to the execution unit 250 in an order that is optimized for high utilization of the multithreaded processor 110. Example instruction fetch sequences and thread execution sequences are illustrated and discussed below with reference to FIG. 6B.

The instruction unit 210 fetches and outputs instructions on a per thread basis. An instruction comprises, for example, a 16-bit, 32-bit, 64-bit ISA (Instruction Set Architecture) instruction, a VLIW (Very Long Instruction Word) instruction, or the like. The instruction unit 210 retrieves instructions according to the instruction fetch algorithm, which in one embodiment comprises bursts of several cycles on a round-robin basis. Inactive threads can be removed from the instruction fetching arbitration according to, for example, bits in an active thread register. From within its instruction hierarchy, the instruction unit 210 retrieves and outputs the instruction corresponding to a state of the packet processing application 120.

In one embodiment, the instruction unit 210 is split into two pipeline stages so that instruction cache accesses are not part of a clock-limiting logic path. In another embodiment, the on-chip instruction hierarchy comprises a local instruction cache exclusive to a single execution unit, a cluster instruction cache shared by several neighboring execution units, and a global instruction cache shared by several clusters. Resorting to off-chip resources such as RAM, or even more, disk drives, requires significantly more clock cycles resulting in longer thread stalls.

In still another embodiment, the instruction unit 210 has an input to receive a feedback signal on signal line 235 from the decode unit 220 indicating queue depths of the instruction queue 225 on a per thread basis. Also, the instruction unit 210 has an input to receive a feedback signal on signal line 255 from the execution unit 250 indicating branch mispredicts. Future instruction fetching and output decisions address the lowest queue depth, maintaining minimum queue depths for each thread, and/or pipeline flushes. Preferably, the instruction unit 210 is optimized for a packet processing instruction set 120.

The decode unit 220 translates instructions into microcode, suitable for the execution unit 250. The microcode comprises, for example, RISC (Reduced Instruction Set Computing) or CISC (Complex Instruction Set Computing) type microinstructions, micro-ops, or the like. Decoded instructions are output to the thread interleaver 230. In one embodiment, the decode unit 220 also comprises a predecode unit (not shown) as a separate pipeline stage. The predecode unit identifies instruction boundaries for variable length instructions, decodes control transfers, and decodes instruction formats. The decode unit 220 is coupled to receive a signal on line 255 from the execution pipeline 255 indicative of, for example, a branch mispredict or other event resulting in instruction invalidation and/or instruction flushing.

The decode unit 220 further comprises an instruction queue 225 to store decoded instructions. The instructions are organized in order of arrival on a per thread basis. The instruction queue 225 comprises an output to send queue depths and/or related information to the instruction unit 210. The instruction queue 225 also comprises an output to send instruction conditions on signal line 235 to the thread interleaver 230. Instruction conditions include, for example, availability, age, or priority indications. The instruction queue 225 comprises an input to receive queue advance signals from the lower pipeline 202. In one embodiment, the instruction queue 225 comprises an input to receive branch mispredicts from execution unit 250. The instruction queue 225 is, for example, a pointer based FIFO with a 2-write, 1-read, 8-deep queue per thread. An entry is, for example, 101 bits and is comprised of an instruction, a program counter, an absolute register address, and predecoded controls for the thread interleaver 230. Those of ordinary skill in the art will recognize that this is just one embodiment, and that the instruction queue 225 may take a variety of forms for handling instructions on a per thread basis.

The thread interleaver 230 interleaves decoded instructions from different threads responsive to thread conditions. Decoded instructions received in a sequence as dispatched from the decode unit 220 populate a pool of available threads. A thread condition signal on signal line 245 feeds back thread conditions from the execution unit to the thread interleaver 230. Thread conditions such as data cache misses and other conditions described below, and instruction conditions determine the resequencing of instructions dispatched from the thread interleaver 230. The resulting thread execution sequence is thus optimized to reduce future threads stalls with a fine-grained thread dispatch disposed proximate to the execution unit 250. The thread interleaver 230 and related methods are described in more detail below.

The execution unit 250 executes decoded instructions. The execution unit 250 comprises, for example, a processing core, a parallel processing element, an ALU (Arithmetic/Logical Unit), an FPU (Floating Point Unit), or the like. The execution unit 250 further comprises a plurality of registers and buffers. Preferably, each thread has at least some dedicated registers in the register file 240 for low overhead context switching. The execution unit 250 can execute a different thread each cycle. In response to an execution stall by a thread, the execution unit 250 activates signal line 245 indicating the stalled thread, other conditions associated with the thread, and thread conditions associated with other threads in the multithreaded processor 110.

The register file 240 includes associated control logic that manages execution registers using an architectural register file (not shown). The architectural register file includes, for example, four copies of 32×32 register files for each thread. The architecture register file comprises flip-flops, latches with precharged bit lines, or the like. The register file maintains a state for each thread, or context. The register file 240 converts register names to physical register addresses and manages register interlocks. In addition, the register file 240 also includes the logic for a datapath to produce the operands.

In one embodiment, an execution pipeline comprises the register file 240 and the execution unit 250. The execution pipeline is coupled directly to the thread interleaver 230 to receive the thread execution sequence. Because the execution pipeline immediately follows thread interleaving, instructions can be executed within a few cycles after sequencing. Advantageously, the execution unit 250 receives instructions sequenced on comparatively recent thread conditions In an alternate embodiment, a plurality of execution units 250 each receives microcode from an associated multithreaded pipeline. The execution units 250 are organized by clusters and share resources on the cluster level or global level.

IV. Thread Interleaver

Figure 3:
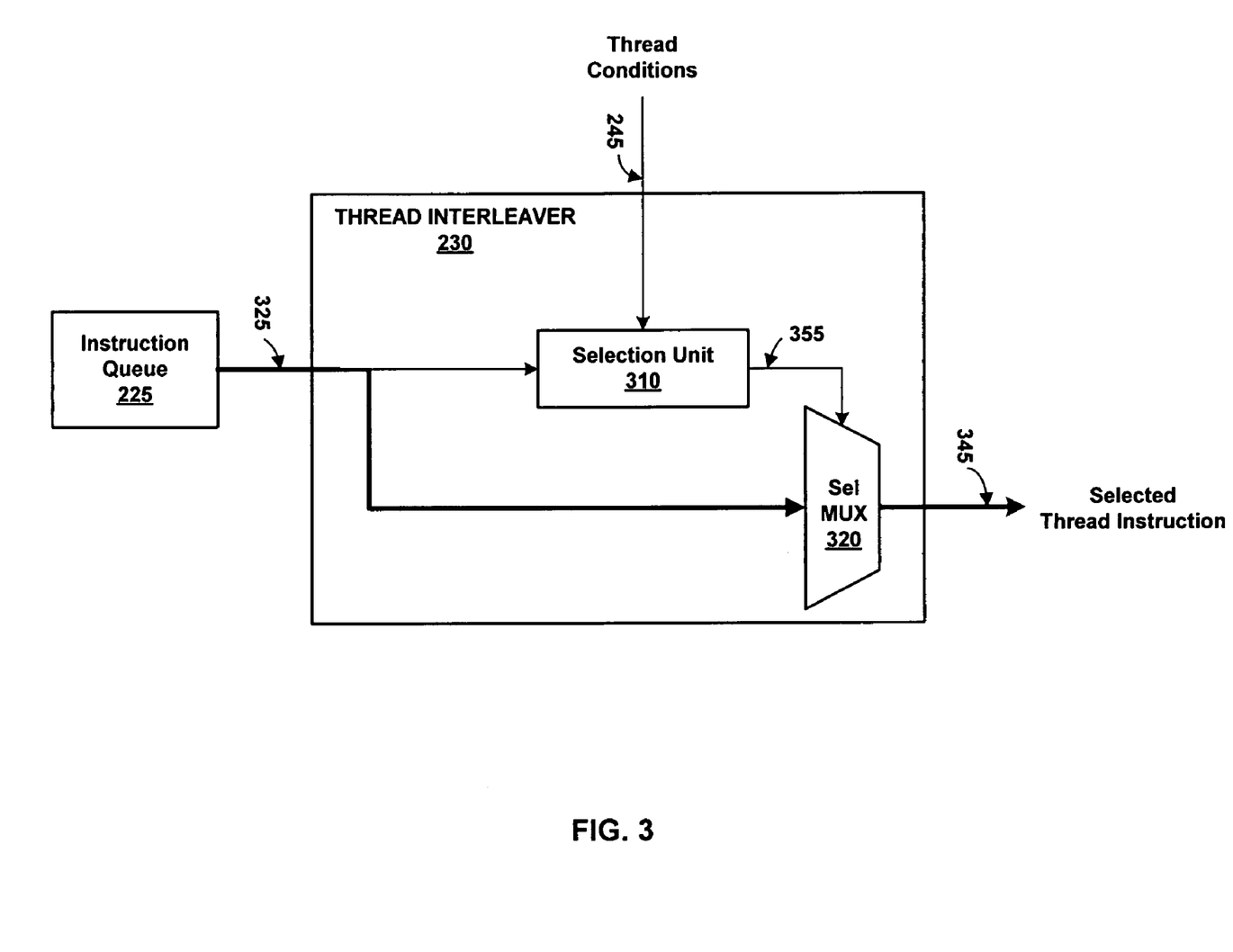
FIG. 3 is a block diagram illustrating the thread interleaver according to one embodiment of the present invention.

FIG. 3 is a block diagram illustrating the thread interleaver 230 according to one embodiment of the present invention. The thread interleaver 230 can be implemented in hardware, software, or a combination of both. The thread interleaver 230 comprises a selection unit 310 and a selection multiplexer ("mux") 320. The selection unit 310 comprises an input to receive an instruction conditions signal from signal line 325 and an output to send a thread selection signal to the selection mux 320 via signal line 355. The selection mux 320 has one or more data inputs coupled to line 325 to receive decoded instructions from the instruction queue 225, a control input coupled to signal line 355 to receive the selection signal from selection mux 320 and an output coupled to signal line 345 to send decoded instruction selections from the thread interleaver 230.

The selection unit 320 selects threads using two-level round robin arbitration. The selection unit 320 is, for example, an arbiter or other logic configured to make selections for output based on input conditions. Accordingly, round robin occurs in the selection unit 320 in two different phases. In one embodiment, round robin occurs between threads with instructions at a high priority level and between instructions at a low priority level. Within a priority level, a thread that is next in line following a previously selected thread has an opportunity to win arbitration. If the next in line thread is ineligible, or is associated with an unavailable instruction, a thread that is second in line has an opportunity to win arbitration. One embodiment of round robin dispatches an oldest or head of queue thread each clock cycle.

The primary thread conditions associated with each thread include execution stalls indicative of thread latencies. Execution stalls include data cache misses, external resource stalls (e.g., from 130), TLB (Translation Lookaside Buffer) misses, intra-thread register interlocks, dependencies, retries, global stalls, main memory misses, L1 or L2 data cache misses, memory operation ordering such as write buffer state, and other latencies of a particular thread. Other thread conditions include global stalls, write buffer capacity interlocks, multicycle cache control operations, test operations, misaligned access stalls, sleep timers, etc. Instruction conditions include instruction availability, external programmer priority, order of arrival at the instruction queue 225, etc.

In a conventional prior art processor a thread stall locks up the execution unit 250 for one to four or more clock cycles as an instruction or data request travels through a hierarchy of resources. Each hierarchy level is likely to operate under clock frequencies inferior to the execution unit 250. In contrast, the present invention uses previous stalls as a condition to current and future thread selections, thus thread stalls such as a high latency cache miss have the opportunity to be resolved. Consequentially, the thread interleaver 230 can advantageously output a decoded instruction to the execution unit 250 that is resequenced with respect to order of fectching. The thread interleaver 230 and related methods are described in more detail below.

The selection mux 320 outputs the decoded instruction according to the thread that wins two-level round robin arbitration. The instruction output is preferably at the head of queue or the oldest of instructions amongst the instructions associated with the selected thread. In another embodiment, instructions are output out-of-order within the selected thread.

Figure 4:
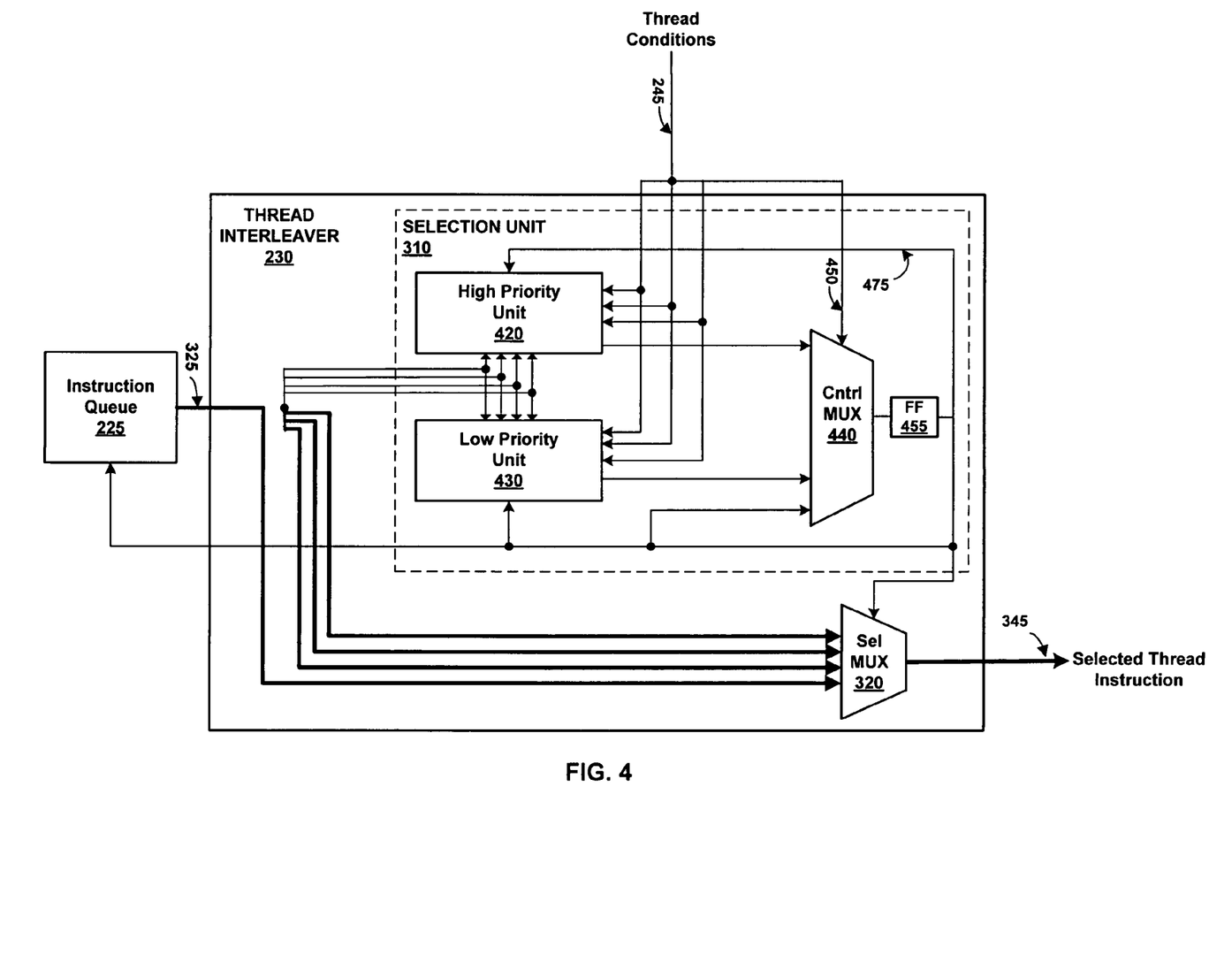
FIG. 4 is a block diagram illustrating the selection unit according to one embodiment of the present invention.
Figure 6A:
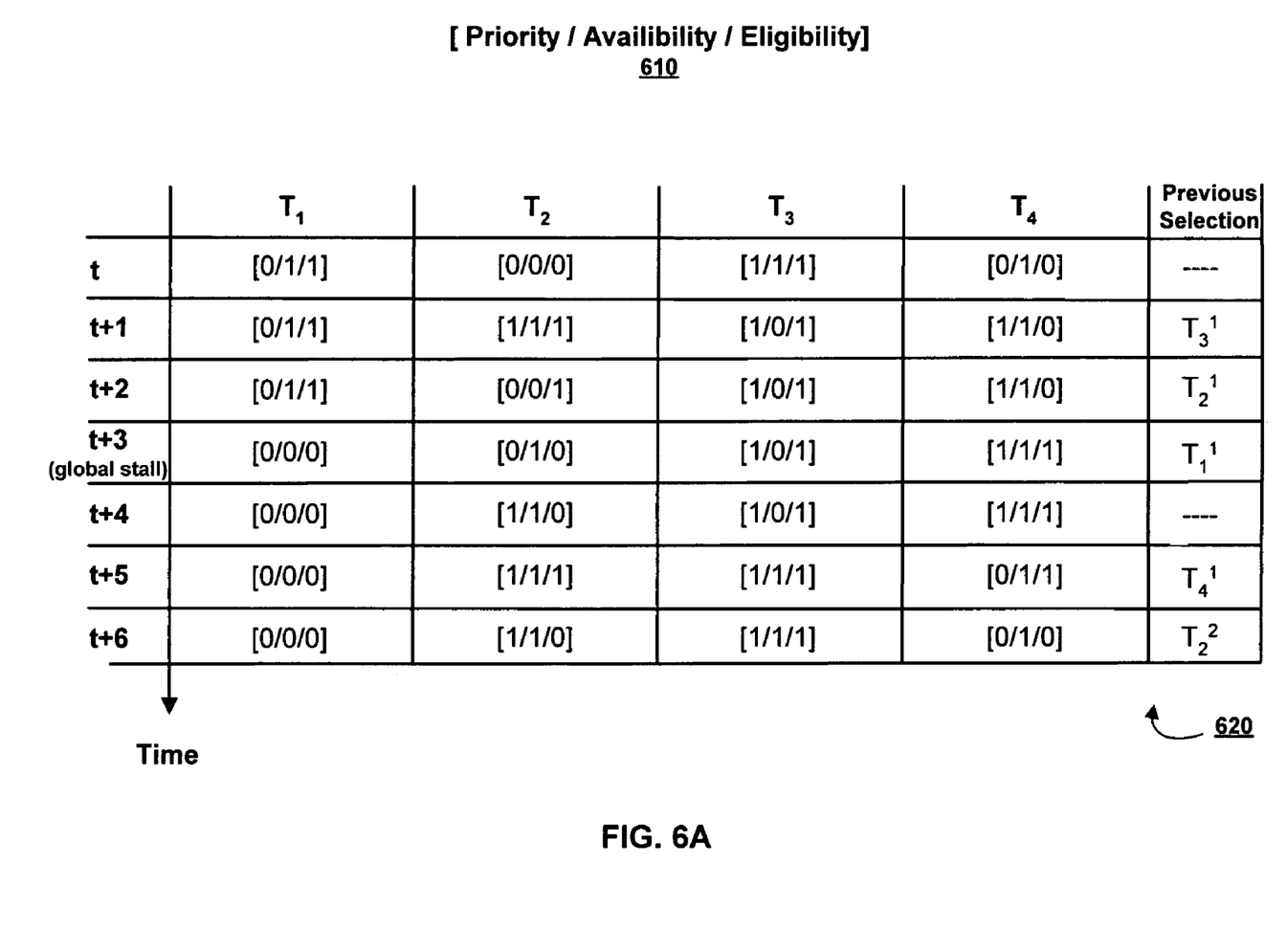
FIGS. 6A-C illustrate two-level round-robin arbitration in the thread interleaver according to an embodiment of the present invention.

FIG. 4 is a block diagram illustrating the thread interleaver 230 according to a second embodiment of the present invention. The selection unit 310 further comprises a high priority unit 420, a low priority unit 430, and a control mux 440. Inputs of the high and low priority units 420, 430 receive thread conditions 335 via signal line 245. One or more bits or bit vectors represent data on signal line 245 as shown in FIG. 6A. Both the high priority unit 420 and the low priority unit 430 are coupled to receive the instruction conditions from signal line 325. The signal line 325 can also be a plurality of signal lines associated with a head of queue instruction from different threads. The instruction conditions include an external priority, and a state of each head of queue instruction, among other things. External priority can be set by a programmer or automatically by a program for code optimizations, by the packet processing application 120 during critical periods, by the instruction unit 210 responsive to branch mispredictions, or the like. Outputs of the high and low priority units 420, 430 are coupled to the control mux 440 to send their selections.

The high priority unit 420 selects between the high priority thread pool based on various thread conditions. In the embodiment of FIG. 4, the high priority unit 420 is coupled to signal lines to receive three thread conditions for one or more threads from signal line 335. In one embodiment, the high priority unit 420 receives thread conditions for individual threads from signal lines. Flip flop 455 is coupled to signal line 475 to indicate a thread selected during a previous clock cycle. The last selection can be stored in a flip flop 455 or other memory element. In a default round robin arbitration mode where the high priority unit 420 selects the oldest thread instruction, the previous selection becomes the youngest thread instruction. The thread condition can be represented by a set of n bits or a bit vector indicating the particular thread or threads out of n threads (e.g., [n−1:0]) that has stalled. The priority signal may comprise a set of bits similar to the thread stall condition. The global stall signal is active during, for example, an interrupt or other stall independent of a condition related to a particular thread.

The low priority unit 430 preferably receives the same thread condition inputs as the high priority unit 420, and is thus coupled to signal line 335. The previous selection is input to the low priority unit 430 via signal line 475. In one embodiment, if the last thread selection differs from the one selected by the low priority unit 420, the next selection remains the same. Example thread conditions are shown in FIG. 6A.

The control mux 440 chooses between the selection of the high priority unit 420 and the low priority unit 430. The default arbitration is to pass through the high priority selection, and when there is none, to pass through the low priority selection. In one embodiment, after a maximum number of consecutive high priority selections, a low priority selection is output notwithstanding available high priority selections. In another embodiment, the control mux 440 is coupled to signal line 450 to receive a late stall signal from the register file 240 or execution unit 250. Late stalls, decoded by register file 240 and/or the execution unit 250, indicate, for example, register interlocks and misaligned access stalls. The late stall signal on signal line 450 indicates an offending thread with a set of bits. If the offending thread is a thread to be output from the selection mux 440, an ultimate selection can be changed. For example, an instruction from the high priority unit 420 that is ordinarily passed through the selection mux 440 is replaced by an instruction from the low priority unit 430 output if a preceding instruction associated with the same thread as the high priority selection caused a late stall.

V. Two-Level Round Robin Arbitration

Figure 5A:
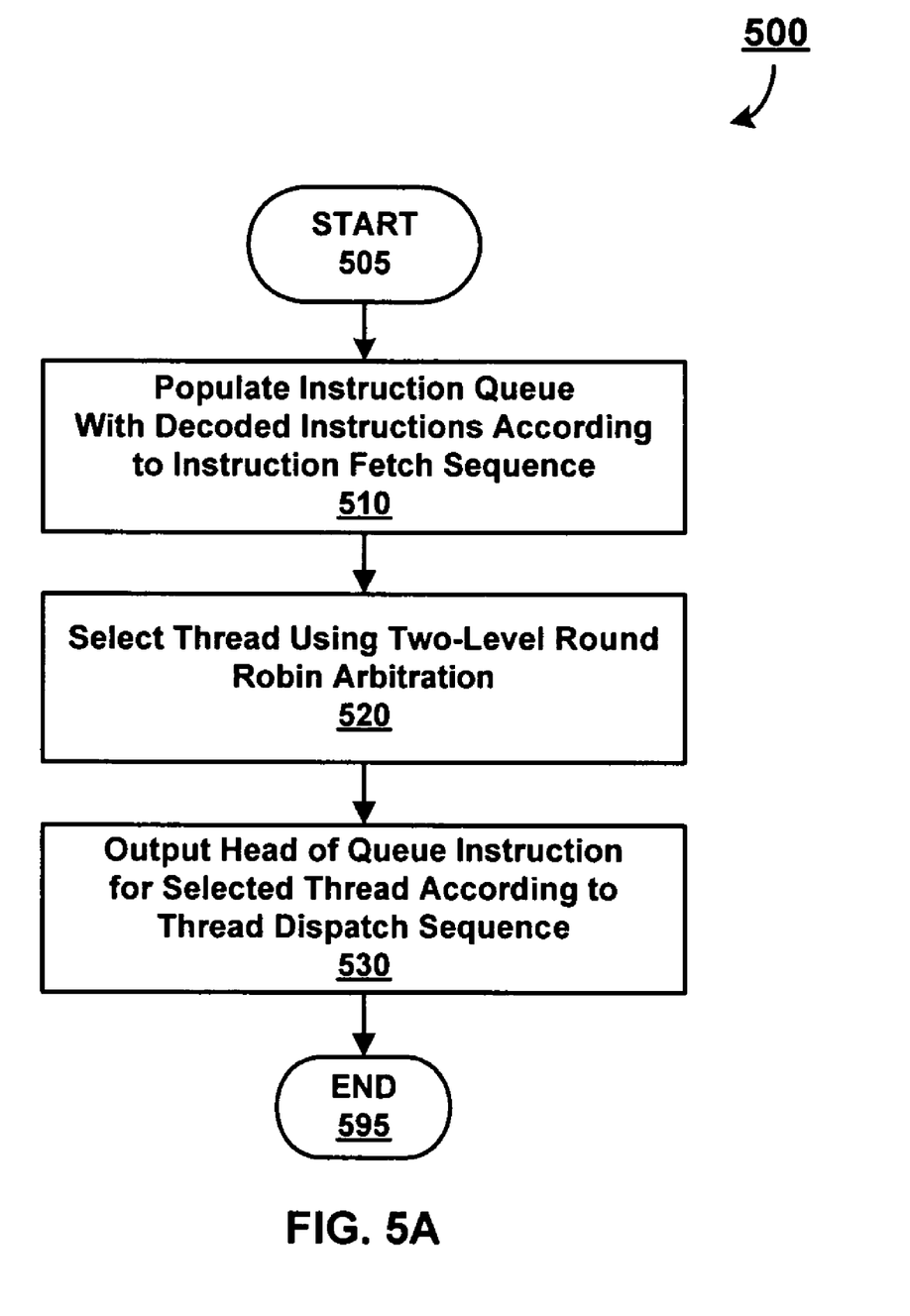
FIG. 5A is a flow chart illustrating a method of thread interleaving in the multithreaded processor according to one embodiment of the present invention.

FIG. 5A is a flow chart illustrating a method 500 of thread interleaving in the multithreaded processor 110 according to one embodiment of the present invention. The decode unit 220 populates 510 the instruction queue 225 with a plurality of decoded instructions from a plurality of threads. Instructions arriving for a thread that already had an instruction in the pool are stacked sequentially behind the previous instructions for the same thread. Individual threads are thus executed in-order.

The selection unit 310 determines 520 a thread execution sequence using two-level round robin arbitration as described in further detail with reference to FIG. 5B. The selection mux 320 outputs 530 a next instruction for the selected thread. Preferably, the next instruction is the head of the instruction queue 225 for the selected thread so that it is executed in-order. In another embodiment, out-of-order execution is implemented on a per-thread basis.

Figure 5B:
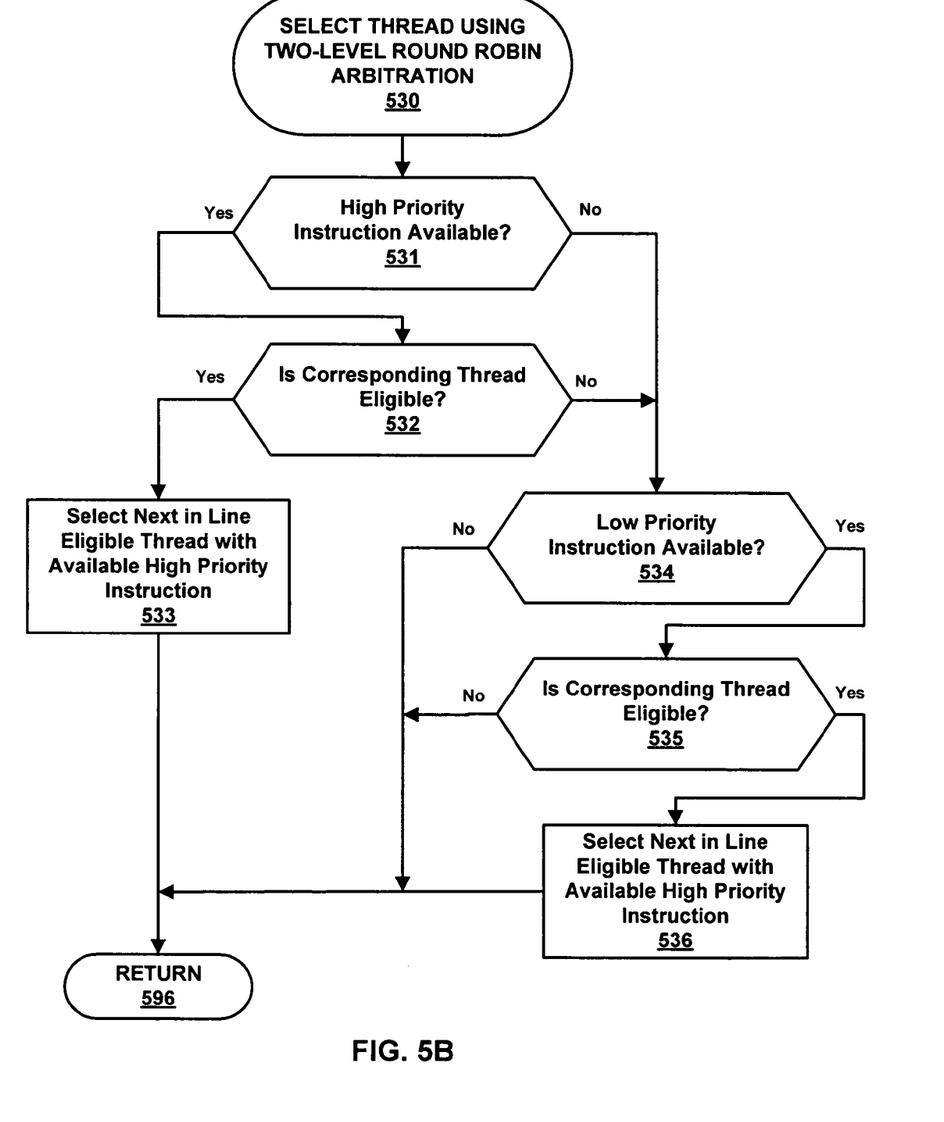
FIG. 5B is a flow chart illustrating the method of selecting an available thread using two-level round robin arbitration according to one embodiment of the present invention.

FIG. 5B is a flow chart illustrating the method of selecting a thread using two-level round robin arbitration according to one embodiment of the present invention. Round robin occurs within the high and low priority units 420, 430 separately, and between eligible threads with available instructions. Accordingly, the thread interleaver 230 determines whether there are one or more high priority instructions available 531. Instructions are available to threads that have a decoded instruction stored in the instruction queue 225. For available high priority instructions, the thread interleaver 230 also determines whether the corresponding threads are eligible for execution 532. Threads are eligible if there are no execution stalls or other thread conditions that would prevent the thread from being executed. Between eligible high priority threads with available instructions, the high priority unit 420 uses round robin arbitration by selecting 533 the next in line thread. If the previously selected thread is $T_1$, thread $T_2$ has an opportunity for dispatch assuming that is as a high priority thread that is eligible and has a corresponding available instruction.

If there are no eligible high priority threads with available instructions, the control mux 440 can select a low priority selection. Similar to the high priority arbitration, the thread interleaver 230 determines whether one or more low priority instructions are available 534 and whether one or more corresponding threads are eligible 535. If so, the low priority unit 430 selects 536 the next in line low priority thread. Otherwise, the process returns 596 without a thread selection. In one embodiment, a present selection can be the same as the immediately previous selection. In another embodiment, the high and low priority selections are made in parallel.

In another embodiment, the control mux 440 overrides the high priority selection. For example, the control mux 440 holds the previous selection if there is a late stall signal or global stall signal. In another example, the control mux 440 prevents thread starvation by selecting the low priority selection after a certain number of consecutive high priority selections. The control mux 440 can also consider a thread age.

Figure 6B:
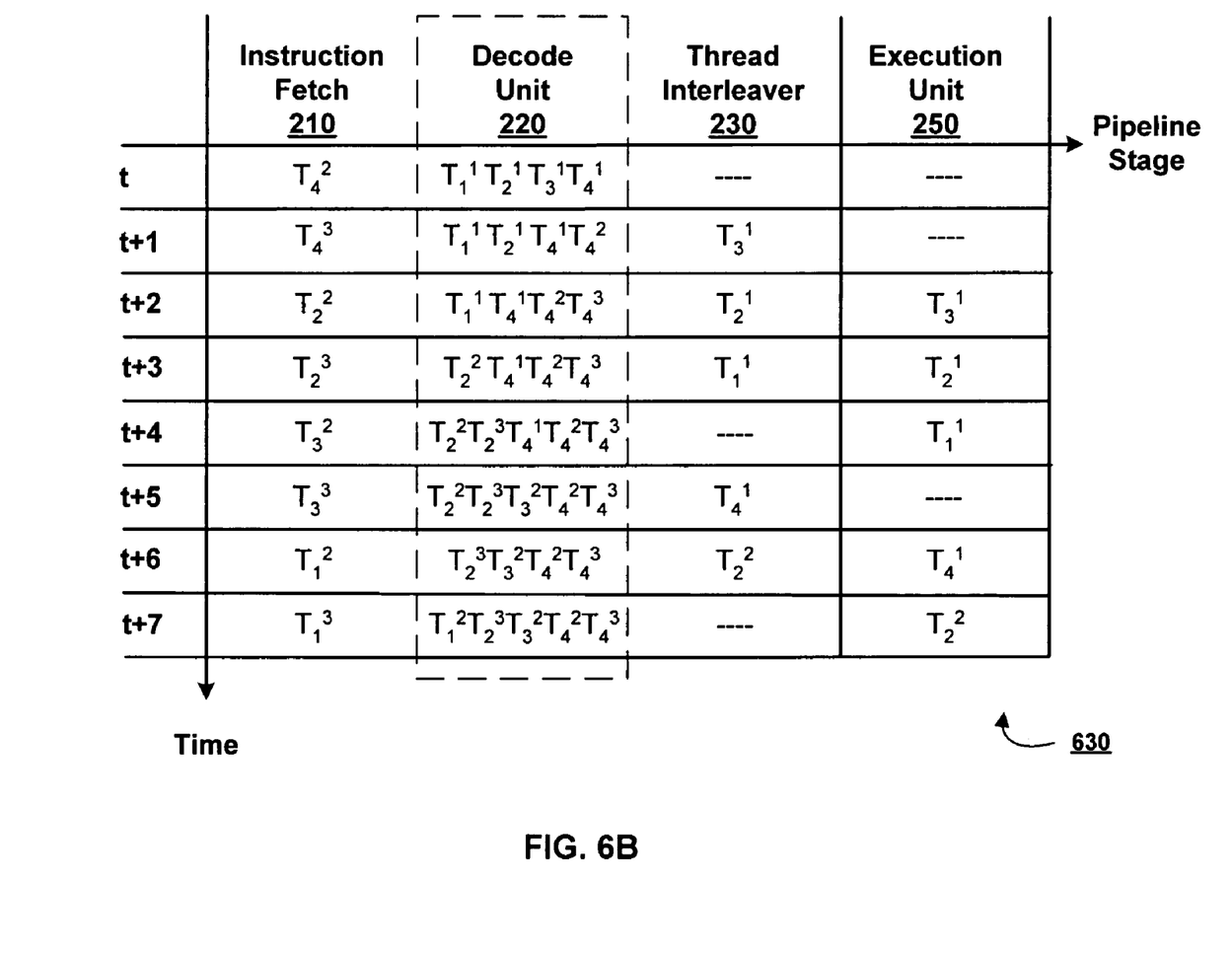
Figure 6C:
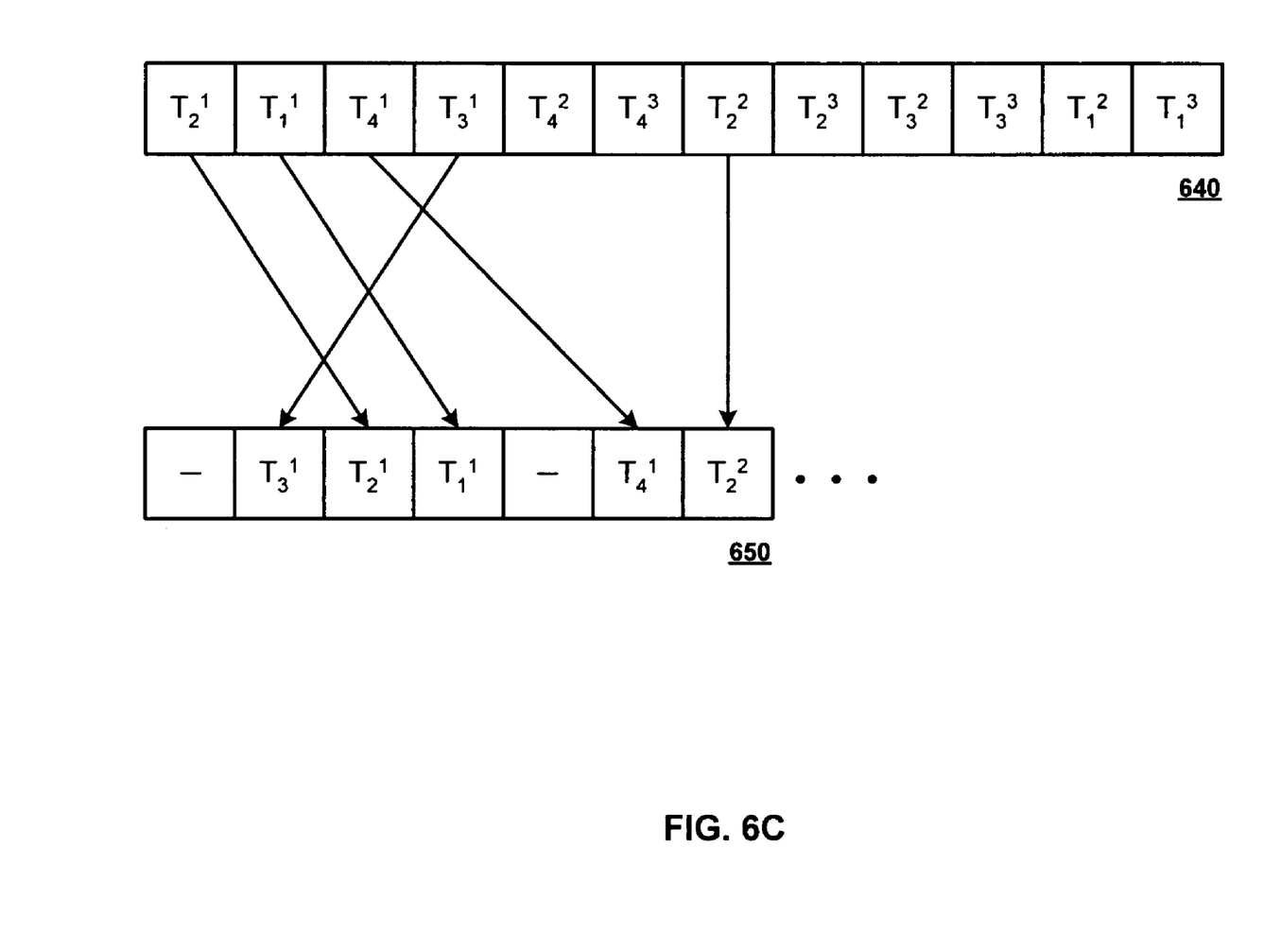

FIGS. 6A-6C illustrate an example of two-level round robin arbitration within the thread interleaver 230 with exemplary thread sequences and exemplary conditions. Additionally, varying and/or alternative arbitrations methods and thread and instruction conditions can be implemented within the scope of the present invention. FIG. 6A is a table displaying the selection unit 310 inputs over successive clock cycles t to (t+6) and FIG. 6B is a table displaying the location of instructions within the multithreaded processor 110, over the same cycles.

In the table 620 of FIG. 6A, each column includes the priority, availability, and eligibility inputs with respect to threads. A bit value of '1' logically indicates a TRUE thread condition and physically indicates a high signal, while a bit value of '0' indicates a FALSE thread condition and a low or negative signal. Descending rows represent successive clock cycles. Each cell thus indicates a bit vector value at a particular time. A bit vector template 610 defines the bit vector as three bits indicating priority, availability, and eligibility from left to right. Turning to a table 630 of FIG. 6B, each column represents sequential pipeline stages 210, 220, 230, 250 and descending rows represent the same successive clock cycles of FIG. 6A. Each cell accordingly represents a location of a $k^{th}$ instruction from one or more threads, $T_m$, during each clock cycle (i.e., $T_m^k$). The decode unit 220 column contains the pool of threads available for arbitration by the thread interleaver 230 at each clock cycle.

In the example at time t, all four threads have an associated instruction in the instruction queue 225 of the decode unit 220. Since $T_3^1$ is the only eligible high priority thread with an available instruction at time t, $T_3^1$ is output from the thread interleaver at time t+1. As shown at t+2 and t+3, $T_3^1$ proceeds through a pipeline stage (i.e., 250) each clock cycle. At time t+1, $T_2^1$, $T_3^1$ and $T_4^1$ are all high priority, but $T_3^1$ does not have an available instruction and $T_4^1$ is not eligible. Consequently, thread interleaver 230 adds $T_2^1$ to the thread execution sequence. If all three threads had the same conditions, round robin would arbitrate to $T_4^1$ since it is the next in line thread after the previous selection of $T_3^1$. At time t+3, since there are no high priority instructions capable of execution, $T_1^1$ a low priority instruction has an opportunity for selection. Of the low priority threads, $T_1^1$ is output as it is the only one with an available instruction.

A global stall occurs at t+3, so no thread is output at t+4 although $T_4^1$ was available and eligible. At t+4, $T_2^2$, another high priority instruction, is now available and eligible and thus would be the selection under normal round robin arbitration. However, the previous selection is held during a global stall, so $T_4^1$ is output by the thread interleaver 230. In another embodiment, another selection is made during a global stall, although the previous selection was not output. At t+5, $T_2^2$ and $T_3^2$ compete under round robin arbitration. Since $T_2^2$ is next in line, it is output at t+6.

FIG. 6C illustrates sequence reordering resulting from the inputs of FIG. 6A in the example pipeline of FIG. 6B. The thread execution sequence 640 in the lower pipeline 203 is resequenced with respect to the instruction fetch sequence 650 in the upper pipeline 202. The sequences are input and output from left to right. In this example, $T_3^1$ and $T_2^2$ moved ahead in the sequence, among other instruction resequencing.

VI. Summary

In summary, the present invention provides a multi-threaded processor 110 with the lower pipeline 202 making fine-grained thread dispatch decisions independent of the upper pipeline 203. An instruction fetching method determines an upper pipeline sequence responsive to an instruction queue depth on a per thread basis. A thread interleaving method determines a lower pipeline sequence responsive to thread conditions. Advantageously, the present invention increases processor utilization, especially in inherently parallel systems such as network processing devices.

We claim:

1. A processor, comprising:
    a selection unit, having a first input to receive a thread conditions signal indicative of one or more execution stalls, the selection unit selecting a thread from a plurality of threads based on the thread conditions signal, further comprising:
        a high priority unit, having a first input coupled to the first input of the selection unit, the high priority unit selecting a thread associated with a high priority instruction from the plurality of threads,
        a low priority unit, having a first input coupled to the first input of the selection unit, the low priority unit selecting a thread with a low priority instruction from the plurality of threads, and
        a control mux, having a first input coupled to an output of the high priority unit and having a second input coupled to an output of the low priority unit, the control mux selecting between the high priority selection and the low priority selection; and
    a selection mux, having a first input coupled to an output of the selection unit to receive the thread selection signal and a second input to receive a plurality of decoded instructions, the selection mux outputting a decoded instruction from the plurality of instructions in response to the thread selection signal.

2. The processor of claim 1, wherein the selection unit selects a thread each clock cycle.

3. The processor of claim 1, wherein a second input to the high priority unit and a second input to the low priority unit are coupled to receive a previous thread selection, and the high priority unit and the low priority unit use round robin arbitration to select a next thread.

4. The processor of claim 1, wherein the high priority unit has a third input and the low priority unit has a third input, the third high priority unit input and the third low priority unit input receiving the instruction conditions signal indicative of availability, the high priority unit selecting between threads with an available high priority instruction and the low priority unit selecting between threads with an available low priority instruction.

5. The processor of claim 1, wherein the control mux defaults to select the high priority selection.

6. The processor of claim 1, wherein the control mux selects the low priority selection after a predetermined number of successive high priority selections.

7. The processor of claim 1, wherein the thread conditions signal comprises a global stall indicator, wherein the control mux holds a selected thread responsive to an active global stall indicator.

8. The processor of claim 1, wherein the control mux selects the low priority selection if there is no high priority selection.

9. The processor of claim 1, wherein the control mux repeats a previous selection.

10. The processor of claim 1, wherein the thread conditions signal is indicative of thread eligibility, and wherein the selection unit selects between eligible threads.

11. The processor of claim 1, wherein the execution stall comprises a data cache miss.

12. The processor of claim 1, wherein the execution stall comprises an external resource stall.

13. The processor of claim 1, wherein the execution stall comprises an interlock.

14. The processor of claim 1, wherein the execution stall comprises a memory operation ordering.

15. The processor of claim 1, wherein the selection unit has a second input to receive an instruction conditions signal, the selection unit selecting a thread based on the instruction conditions signal.

16. The processor of claim 15, wherein the instruction conditions signal is indicative of one or more thread ages.

17. The processor of claim 15, wherein the instruction conditions signal is indicative of whether an instruction is available for each of the plurality of threads, and wherein the selection unit selects between available threads.

18. The processor of claim 15, wherein the instruction conditions signal comprises a priority indicator generated external to the selection unit to indicate a priority level of one or more threads.

* * * * *